United States Patent [19]

Storisteanu et al.

[11] Patent Number: 5,524,191

[45] Date of Patent: Jun. 4, 1996

[54] METHOD OF EDITING TEXT IN COLUMN SENSITIVE ENVIRONMENTS

[75] Inventors: Adrian Storisteanu, Toronto; Zemin Wang, Scarborough, both of Canada

[73] Assignee: International Business Machines Corporation, Armonk, N.Y.

[21] Appl. No.: 237,743

[22] Filed: May 4, 1994

[30] Foreign Application Priority Data

Sep. 9, 1993 [CA] Canada ................................. 2105847

[51] Int. Cl.⁶ .................................................. G06F 17/24
[52] U.S. Cl. .................................... 395/146; 395/144
[58] Field of Search .................................. 395/144, 145, 395/146, 148, 150–151; 364/419.01, 419.02–419.17; 400/109–111

[56] References Cited

U.S. PATENT DOCUMENTS

| | | | |
|---|---|---|---|
| 4,559,614 | 12/1985 | Peek et al. | 364/900 |
| 5,084,820 | 1/1992 | Nagaya et al. | 364/419 |
| 5,091,878 | 2/1992 | Nagasawa et al. | 364/419 |
| 5,257,351 | 10/1993 | Leonard et al. | 395/150 |
| 5,317,509 | 5/1994 | Caldwell | 364/419.08 |
| 5,321,801 | 6/1994 | Ando | 395/145 |
| 5,337,233 | 8/1994 | Hofert et al. | 364/419.14 |
| 5,418,718 | 5/1995 | Lim et al. | 364/419.16 |

*Primary Examiner*—Almis R. Jankus
*Assistant Examiner*—Joseph H. Feild
*Attorney, Agent, or Firm*—Jonathan E. Jobe; Andrew J. Dillon; Craig J. Yudell

[57] ABSTRACT

A method and editor for editing a line of text comprising mixed single-byte character set (SBCS) and double-byte character set (DBCS) text while maintaining the columnar integrity of the text after the edit point. The method and editor provide an extended cursor to indicate to the user the text which will be affected by the editing operation. The method and editor are operable on computer systems which require Shift Out (SO)-Shift In (SI) control characters, on systems which support emulated SO-SI control characters and on systems which do not.

2 Claims, 2 Drawing Sheets

| CLASS | STATE | ACTION | START TEXT | REP. TEXT | EDITED TEXT |
|---|---|---|---|---|---|
| NS | NSS | 11S | EOITE | X | EX_ITE |
|  | NSD | 21SB | E文TE | X | EX_TE |
| ND | NDSS | 22D | EXITE | 本 | E本TE |
|  | NDSD | 32DB | EX文TE | 本 | E本_TE |
|  | NDD | 22D | E文TE | 本 | E本TE |
| SS | SSS | 11S | EOITE | X | EXITE |
|  | SSOI | 21SB | E▲ITE | X | EX_ITE |
|  | SSODI | 41SBBB | E▲文▼ITE | X | EX_ ITE |
|  | SSOD | 31SBO | E▲文本▼ITE | X | EX_▲本▼ITE |
|  | SSDI | 32ISB | E▲文本▼ITE | X | E▲文▼X_ITE |
|  | SSDDI | 52ISBBB | E▲字文與▼ITE | X | E▲字▼X_ ITE |
|  | SSDD | 42ISBO | E▲字文與本▼E | X | E▲字▼X_▲本▼E |
| SD | SDS | 43ODI | EXITED | 文 | E▲文▼D |
|  | SDSSO | 33OD | EXI▲文▼D | 字 | E▲字文▼D |
|  | SDSXXXI | 53ODIB | EX▲文▼D | 字 | E▲字▼ D |
|  | SDSXXXD | 63ODIBO | EX▲文字漢▼D | 本 | E▲本▼ ▲漢▼D |
|  | SDIS | 32DI | EX▲文▼DED | 字 | EX▲文字▼D |
|  | SDISOI | 42DIB | E▲文▼D▲▼D | 字 | E▲文字▼ D |
|  | SDISOD | 52DIBO | ▲文▼E▲本漢▼D | 字 | ▲文字▼ ▲漢▼D |
|  | SDIO | 22D | E▲文▼▲字▼D | 本 | E▲文本字▼D |
|  | SDD | 22D | E▲文▼D | 字 | E▲字▼D |

*Fig. 3*

METHOD OF EDITING TEXT IN COLUMN SENSITIVE ENVIRONMENTS

BACKGROUND OF THE INVENTION

1. Technical Field

The present invention relates in general to text editors which support double-byte character sets (DBCS). More specifically, the present invention relates to text editors for mixed DBCS and single-byte character set (SBCS) text in systems with SO-SI control characters or with emulated SO-SI control characters or without SO-SI control characters, and to a method, for use therein, of accomplishing text replacement while maintaining the columnar integrity of the text.

2. Description of the Related Art

Characters in computer systems are typically stored as a number code which is interpreted by the computer system in accordance with a code table. Common examples of such codes are the ASCII code, which is used in most Roman alphabet (A to Z) based personal computers, and the EBCDIC code used in many mainframe computers. Typically, each character defined in the ASCII or EBCDIC code requires a single byte of storage space and thus up to $256(2^8)$ unique characters (including alphanumerics, symbols and control or other reserved characters) may be defined.

When other, non-Roman alphabet character sets are desired, for example Japanese Kanji or Chinese pictograph characters, more than 256 unique characters may be required. To enable the necessary number of characters to be defined, double-byte character sets (DBCS) have been employed wherein each character is defined by two bytes of storage space. This allows over $65,000(2^{16})$ unique characters to be defined.

In countries that use ideographic characters like China and Japan, it is important that DBCS and SBCS text can be intermixed in a single document. For example, a database program may be originally written in English and a non-English version may be sold wherein Roman alphabet prompts and other user interface information is replaced with non-Roman alphabet prompts (i.e. —Japanese Kanji characters), allowing mixed DBCS and SBCS text to be stored in the database program.

Previously, when producing such a program or text file with mixed SBCS and DBCS characters on an EBCDIC terminal, a user would switch the terminal from SBCS mode to DBCS mode by employing a Shift Out (SO)-Shift In (SI) sequence which places a DBCS identifier before (SO) and after (SI) the DBCS characters. When the computer encounters a SO identifier (control character), it knows that the next byte is the first byte of a two-byte DBCS character and not a SBCS character. The terminal continues to interpret the data as two-byte DBCS characters until a SI control character is encountered.

For example, to place the Chinese pictograph 文 in a text string, the user would Shift Out (SO) of SBCS mode by pressing a Shift Out key (or predefined Shift Out key sequence such as ALT-ESC) on the terminal, compose the desired pictograph character by pressing a predefined key sequence or by entering a predefined number code such as 8248 (comprising two hexadecimal digits, 82 and 48, representing the two bytes identifying the DBCS character) and then re-enter SBCS mode by pressing a Shift In key or key sequence. Depending upon the particular display and computer system in use, the 文 symbol may be displayed on screen or representative code numbers may be displayed in its place. Further, a representative symbol may be displayed indicating the location of the SO and SI control characters.

More recently, personal computer operating systems such as the IBM[1] OS/2[2] operating system have provided code page support which allows DBCS characters to be stored without requiring a SO-SI sequence. In such systems, the first byte of the DBCS character is a byte which is not used within the SBCS character set and thus identifies the following byte as a member of a DBCS character set. Several different first bytes (each not used in the SBCS character set) may be used to refer to several different 'pages' of 256 unique DBCS characters. The actual first byte values selected vary between languages and system. For example, in one IBM system the values 129 through 252 (which are not used for Roman alphabet characters) are the first bytes of DBCS character sets for Chinese pictographs.

[1]Registered trade mark
[2]Registered trade mark

Depending upon the particular system in use, DBCS characters may be displayed as two, two-digit hex numbers (e.g. 8248) or as the actual pictogram (i.e. 文). Additionally, depending upon whether SO-SI characters are required, not required, or emulated, the DBCS may be preceded and followed by SO-SI symbols as appropriate (i.e. ▲文▼).

Despite the above-mentioned capabilities of computer systems, a problem exists with text containing a mixture of SBCS and DBCS characters in that, for many applications, the columnar positioning of the text is critical. For example, when programming in programming languages like RPG, RPGII or Fortran, the position of command and data text on a line (i.e.—its columnar positioning) is crucial to the correct interpretation of that text within the program. When the text is a mixture of SBCS characters and DBCS characters it is difficult and onerous to replace (edit) the text while maintaining its columnar integrity.

Some examples of these difficulties are: replacing "▲文▼", which occupies four bytes (one for the Shift Out control character, two for the DBCS character code and one for the Shift In control character) with a SBCS character which requires a single byte; replacing "A", which requires one byte with "文" which requires two bytes of storage space (or as many as four bytes if SO and SI control characters are required). In each example, the columnar integrity of the text on the line, after the site of the replacement, will be affected.

Text editors capable of editing mixed SBCS and DBCS text do not presently maintain the columnar integrity (i.e.—columnar positioning) of text on a line after an editing operation has been performed. Thus, the user must manually adjust the text to maintain columnar integrity by manually inserting spaces or deleting characters and a failure to do so, or doing so incorrectly, results in those subsequent characters being moved out of their desired columnar positions leading to the program misinterpreting the command and/or data text on that line. Further, in systems wherein a fixed line length is set, an edit operation may be aborted by the system as it would result in the maximum line length being exceeded, even in situations where the maximum line length is exceeded as an intermediate editing step and the final line length would be acceptable. It can be most confusing and frustrating to a user to attempt an edit operation which is refused by the system, for no apparent reason, especially when the same edit was performed on a preceding (albeit shorter) line without difficulty.

Also, when a replace edit operation is performed, it is often difficult for the user to determine the extent to which the edit operation will affect subsequent text. For example, replacing the "A", in "CABLE" with a DBCS character such as "文", will result in the "B" after the "A", also being overwritten to give "C 文LE". When SO-SI characters are present in the text to be edited, replacement operations become still more confusing and difficult to implement properly.

It is desirable therefore, to provide a method of editing mixed SBCS and DBCS text which maintains columnar integrity of the edited text. It is also desired to provide an indication to the user of the extent to which a character replacement will affect subsequent text on a line and to avoid the problems of exceeding maximum line lengths.

SUMMARY OF THE INVENTION

It is an object of the present invention to provide a novel method of editing mixed character set text which maintains columnar integrity of the text. It is a further object to provide a novel text editor for editing mixed character set text which maintains columnar integrity of the text.

According to one aspect of the present invention, there is provided a method of editing at least one character of a line of text containing mixed DBCS and SBCS characters while maintaining the columnar integrity of the text, comprising the steps of:

(i) positioning an edit cursor on a character to be replaced;

(ii) determining a present Class of the editor;

(iii) determining a present State of the text to be edited at the edit cursor location;

(iv) selecting a predefined Action associated with the present State;

(v) displaying an extended cursor indicating the text to be affected by the replacement according to the predefined Action;

(vi) composing a replacement text string comprising a replacement character and, if defined by the predefined Action, at least one of a character indicating the start of DBCS characters, a character indicating the end of DBCS characters and a blank character;

(vii) replacing the affected text with the replacement text string; and (vii) repositioning the edit cursor immediately after the replacement character.

According to another aspect of the present invention, there is provided a text editor for editing a line of SBCS and DBCS mixed text and maintaining the columnar integrity of the text during the edit operation, comprising:

means for positioning an edit cursor on a character to be replaced;

means for determining the Class of the editor;

means for determining the State of the character to be replaced, and the Action associated with the determined State;

means to provide a visual indication of the extent of the line of text to be affected by the replacement according the associated Action;

means to compose a replacement text string for the text to be affected comprising at least a replacement character and, if defined by the associated Action, at least one of a character indicating the start of DBCS characters, a character indicating the end of DBCS characters and a blank character;

means to replace said text to be affected with said replacement text string; and means to reposition the edit cursor to the character immediately after the replacement character.

The above as well as additional objects, features, and advantages of the present invention will become apparent in the following detailed written description,

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 shows a table of defined Classes, States and Actions of the present invention, along with examples of each Action.

DETAILED DESCRIPTION OF PREFERRED EMBODIMENT

Figure 1:
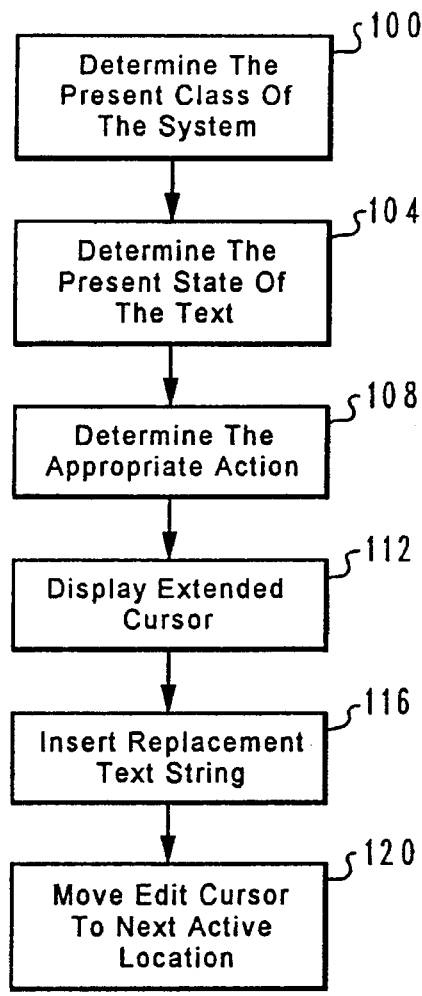
FIG. 1 is a flowchart showing the operational steps of the present invention.

FIG. 1 shows a flow chart of the steps performed in a preferred embodiment of a text editor embodying the present invention. As the editor allows for the editing (replacement) of SBCS and DBCS mixed text on various computer systems, the first step 100 is for the editor to determine the Class of the system it is operating on.

Figure 2:
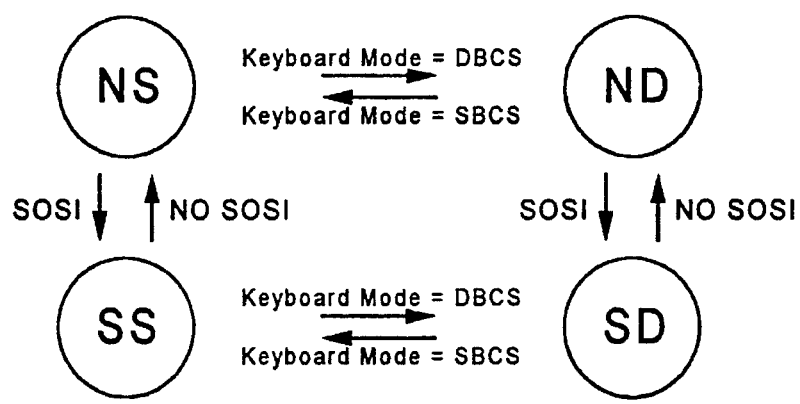
FIG. 2 shows the four possible Classes of a computer system in accordance with the present invention.

The four possible Classes are shown in FIG. 2 wherein:

NS—indicates a system which does not maintain SO-SI symbols, the system's keyboard being in SBCS mode;

ND—indicates a system which does not maintain SO-SI symbols, the system's keyboard being in DBCS mode;

SS—indicates a system with SO-SI requirements, or which emulates SO-SI characters, the system's keyboard being in SBCS mode; and SD—indicates a system with SO-SI requirements, or which emulates SO-SI characters, the system's keyboard being in DBCS mode.

An example of a system which does not maintain SO-SI symbols would be an ASCII—based system such as a PC running the IBM OS/2 Presentation Manager[3] wherein the mixed text was not intended for subsequent use on systems requiring SO-SI control characters for handling DBCS text. An example of a system with emulated SO-SI requirements is the above-mentioned OS/2 Presentation Manager system wherein the mixed text is intended for subsequent use on systems that require SO-SI characters. An example of a system with SO-SI requirements would be an EBCDIC-based system, such as a terminal for use with an IBM AS/400[4] system. In all cases, the keyboard would be switched between SBCS or DBCS mode in a suitable manner. As shown in FIG. 2, a change in keyboard mode or a change in whether the system is in a SOSI maintenance mode results in a change of the system's Class.

[3]Registered trade mark
[4]Registered trade mark

If the editor is intended to be used on different systems and/or terminals, appropriate calls may be made to operating system functions to determine the present Class of the system. Alternatively, if the editor is intended to be used on a single type of system or terminal, the determination of whether the system has SO-SI requirements would be inherent and operating system calls would only need to be performed to determine the current keyboard mode.

Referring again to FIG. 1, once the Class of the system has been determined, the next required step 104 is to determine the State of the system. Each of the above-listed Classes has two or more possible States defined depending upon the type of text the edit cursor is located on and, in some cases, the type of text one or more characters after the edit cursor. The mnemonics for the States are defined according to the format "AABBB", wherein: AA represents the current Class of the system and BBB indicates, depending upon the State, the type of one or more characters at or adjacent to the present edit cursor location. In the description below: D indicates a DBCS character; S indicates a SBCS character; I indicates the Shift In character; O indicates the Shift Out character; and X indicates any type of character (don't care).

There are four sets of elements used in determining the State defined for a particular Class:

$S_d$ is the set of all the first bytes of DBCS characters defined (in code page based systems, this would be the set of code page identifiers and in other systems this would be determined by the presence of the character in a sequence delimited by SO-SI characters);

$S_s$ is the set of all the valid SBCS characters, excepting the SO and SI characters;

$S_i$ is the SI character; and $S_o$ is the SO character.

To determine the particular State within a Class, a function is employed which returns the character at, or after, the edit cursor position and the identity of the set the character belongs to. For convenience, this function is referred to herein as the line(i) function, wherein line(O) returns the character (and its set) at the present location of the edit cursor, line(1) returns the character (and its set) immediately after the edit cursor, line (2) returns the second character (and its set) after the edit cursor, etc. The method of determining a particular State is described below.

Class NS has two States defined for it, namely NSD and NSS. State NSD is defined when line(O) is an element of set Sd (i.e.—the edit cursor is located on the first byte of a DBCS character). State NSS is defined when line(O) is not an element of set $S_d$(i.e.—the edit cursor is not on the first byte of a DBCS character).

Class ND has three States defined for it, namely NDD, NDSD and NDSS. State NDD is defined when line(O) is an element of set $S_d$; State NDSD is defined when line (O) is not an element of set $S_d$ and line(1) is an element of set $S_d$; and State NDSS is defined when neither line(O) nor line( 1 ) are elements of set $S_d$.

The States defined for Classes SS and SD are determined in a somewhat more complex manner. Class SS has seven States defined for it, namely: SSOI; SSODI; SSOD; SSDI; SSDDI; SSDD; and SSS. In determining the particular State defined for Class SS, the edit cursor is advanced by the editor until line(O) is not an element of set $S_i$. Once line(O) is not an element of set $S_i$, a determination of the defined State is performed in accordance with the following table:

if line(O) is an element of set $S_o$ then if line(1)is an element of set $S_i$, State SSOI is defined;

else if line(3) is an element of set $S_i$, State SSODI is defined;

else State SSOD is defined.

if line(O) is an element of set $S_d$ then if line(2) is an element of set $S_i$, State SSDI is defined;

else if line(4) is an element of set $S_i$, State SSDDI is defined;

else State SSDD is defined.

if line(O) is not an element of set $S_o$ and line(O) is not an element of set $S_d$, then State SSS is defined. Similarly, Class SD has nine States defined for it and the edit cursor is advanced by the editor until line(O) is not an element of set $S_o$. The determination of the particular defined State is then performed in accordance with the following table:

if line(O)is an element of set $S_i$ then if line(1)is an element of set $S_o$, State SDIO is defined;

else if line(2)is an element of set $S_s$, State SDIS is defined;

else if line(3)is an element of set $S_i$, State SDISOI is defined;

else State SDISOD is defined.

if line(O)is an element of set $S_d$, State SDD is defined;

<tab> else if line(4)is an element of set $S_i$, State SDSXXXI is defined;

<tab> else if line(4)is an element of set $S_d$, State SDSXXXD is defined;

else<tab> if line(2)is an element of set $S_o$, State SDSSO is defined;

else<tab> State SDS is defined.

Once the particular State has been determined, step 108 comprises selecting the corresponding Action in accordance with the table in FIG. 3. The mnemonic for each Action is defined according to the format "12T", wherein: 1 indicates the number of bytes of text to be highlighted by an extended cursor; 2 indicates the number of bytes the edit cursor is to be moved to the right after text replacement has been accomplished; and T indicates the replacement text which may be any combination of one or more DBCS and SBCS characters, the $S_i$ control character, the SO control character and blanks (indicated by a 'B').

The table of FIG. 3 lists the Action defined for each Class and State and shows an example text string before (START TEXT) and after (EDITED TEXT) an edit has been performed. The START TEXT column shows text strings for which the Class and State have been determined in accordance with the edit cursor position. The defined Action for the particular Class and State is performed at steps 112, 116 and 120. Step 112 comprises displaying the extended cursor which visually identifies the text characters which will be affected by the edit operation. In FIG. 3, the extended cursor is shown by shading of the affected characters (i.e.—'▓') and the present position of the edit cursor (i.e.—the line(O) position) is the leftmost character covered by the extended cursor. It will be understood by those of skill in the art that the method of displaying the extended cursor is not particularly limited and any suitable visual indication such as reverse video or a color change may be employed.

The REP. TEXT column shows the text which is input at the keyboard and which is combined with any necessary control characters and/or blanks to form the replacement text string which, at step 116, is inserted to replace the text indicated by the extended cursor. Once the replacement text string is inserted, the new, updated position of the edit cursor is calculated at step 120. The EDITED TEXT column shows the result of the edit and the new edit cursor position is indicated by the underscore character (i.e.—'_').

It will be apparent to those of skill in the art that the use of the underscore character in FIG. 3 is merely for clarity and that, in actual use, once the new updated edit cursor position is determined, the editor would repeat the above-mentioned steps of determining the Class, State and defined Action based upon the type of text at the new edit cursor position (line(O)) and a new extended cursor would be displayed.

The Actions shown in FIG. 3 vary from the trivial, such as the straight replacement of SBCS text (State NSS), to the quite complex, such as the replacement of a SBCS character with a DBCS character where the SBCS character to be replaced precedes a single DBCS character which is surrounded by SO and SI control characters (State SDSSO). In the first case, which is essentially the standard overwrite mode of most text editors, the extended cursor highlights the single character to be affected, the character is replaced and the edit cursor is moved to the next character. In the second case, the extended cursor highlights the three characters to be affected, a SO control character is placed at the edit cursor position (line(O)) by the editor, the DBCS replacement character from the keyboard is placed at the next two positions (line(1) and line(2)) and the edit cursor is updated by moving it three spaces to the right onto the second DBCS character.

Two Actions of particular interest are those defined for States SDSXXXI and SDSXXXD. These particular States include state reductions which provide a degree of optimization in determining the system's State. Specifically, if the system is in Class SD and line(O) is an element of $S_s$, and line(4) is an element of $S_i$ or line(4) is an element of $S_d$ then there are two optimizations which are possible and these optimizations are derived as follows:

if, line(4) is an element of $S_i$ then there are three possible configurations of line(1), line(2) and line(3). Specifically, provided valid DBCS and SBCS text strings are considered, these three characters can be SSO, OIO, or OD and each results in the same defined action, namely 53ODIB;

if line(4) is an element of $S_d$ there are only the same three possible configurations of line(1 ), line(2) and line(3) and each results in the same defined action, namely 63ODIBO.

Thus, if the Class of the System is SD and line(O) is an element of $S_s$, the system need not check line(1), line(2) and line(3) but only needs to check line(4) to determine whether the State is SDSXXXI or SDSXXXD.

It will be apparent to those of skill in the art that the editor will continuously monitor the present Class of the system and will re-determine the appropriate State and Action as required. For example, once the edit has been performed in the SDSSO State example of FIG. 3, the result is E▲字 文▼D with the new edit cursor position being on the first byte of the 文文. Since the keyboard of the system is still in DBCS mode and the new Class and State (based upon the new edit cursor position) of the system would be SDD, the extended cursor would be displayed by the system as E▲字 文▼D. If however, the user wished to replace the 文 with a SBCS character, the keyboard mode of the system would be switched to SBCS mode and the editor would re-determine the Class, State and Action. Specifically, the system would determine that the State was now SSDI and the extended cursor would be displayed as E▲字 文▼D. The replacement text would then be read from the keyboard as it is input and the replacement of the text and repositioning of the edit cursor would proceed as described previously.

The present invention provides a novel and useful method and a text editor for editing SBCS and DBCS mixed text while maintaining the columnar integrity of the text. The present invention will operate with computer systems requiring SO-SI control characters, with systems which support emulated SO-SI control characters, and with those which do not. The present invention also provides a convenient visual indication of the text which will be affected by an edit operation through the display of an extended cursor.

While the invention has been particularly shown and described with reference to a preferred embodiment, it will be understood by those skilled in the art that various changes in form and detail may be made therein without departing from the spirit and scope of the invention.

We claim:

1. A method in a text editor of editing at least one character of a line of text containing mixed DBCS and SBCS characters while maintaining the column position of the unedited text, comprising the steps of:

(i) positioning an edit cursor on a character to be edited;

(ii) determining a present Class of the text editor from a plurality of possible Classes for the text editor;

(iii) determining a present State of the text to be edited at the edit cursor location, wherein there are a plurality of possible States for the text;

(iv) selecting a predefined Action associated with the present State and present Class;

(v) displaying an extended cursor indicating the text to be replaced according to the predefined Action;

(vi) composing a replacement text string comprising a replacement character and, as directed by the predefined Action, at least one of a character indicating the start of DBCS characters, a character indicating the end of DBCS characters, and a blank character;

(vii) replacing the text indicated by the extended cursor with the replacement text string; and (vii) repositioning the edit cursor on the character immediately after the replacement text string.

2. A text editor for editing a line of SBCS and DBCS mixed text and maintaining the column position of the unedited text during the edit operation, comprising:

means for positioning an edit cursor on a character to be edited;

means for determining a present Class of the text editor from a plurality of possible Classes for the text editor;

means for determining a present State of the character to be replaced, wherein there are a plurality of possible States for the text and an Action associated with the determined State and Class;

means to provide a visual indication of the text to be replaced according to the associated Action;

means to compose a replacement text string comprising at least a replacement character and, as directed by the associated Action, at least one of a character indicating the start of DBCS characters, a character indicating the end of DBCS characters, and a blank character;

means to replace the indicated text with said replacement text string; and means to reposition the edit cursor on the character immediately after the replacement text string.

\* \* \* \* \*

UNITED STATES PATENT AND TRADEMARK OFFICE
CERTIFICATE OF CORRECTION

PATENT NO. : 5,524,191
DATED : June 4, 1996
INVENTOR(S) : Storisteanu et al.

It is certified that error appears in the above-indentified patent and that said Letters Patent is hereby corrected as shown below:

Column 5, line 43: change "Sd" to --$S_d$--

Column 5, line 51: change "(1" to --(1)--

Column 5, line 52: delete ")" before the word "are"

Signed and Sealed this

Fifth Day of November, 1996

Attest:

BRUCE LEHMAN

Attesting Officer     Commissioner of Patents and Trademarks